United States Patent Office 3,583,963
Patented June 8, 1971

3,583,963
USE OF HYDRAZINE TO INHIBIT VINYL POLYMERIZATION
John Edwin Bristol, Niagara Falls, and Watson Eggleston, Newfane, N.Y., assignors to E. I. du Pont de Nemours and Company, Wilmington, Del.
No Drawing. Continuation-in-part of application Ser. No. 630,544, Apr. 13, 1967. This application Nov. 20, 1969, Ser. No. 878,561
Int. Cl. C08f 1/88
U.S. Cl. 260—89.1            7 Claims

ABSTRACT OF THE DISCLOSURE

Hydrazine or a hydrazine salt such as hydrazine monoacetate is used to inhibit lower vinyl ester (e.g., vinyl acetate) polymerization in stripping the vinyl ester monomer from the ester polymer product. The vinyl ester polymer product and derived products, such as polyvinyl alcohol, have improved color and odor characteristics in comparison with polymers prepared using the customary inhibitors, such as sulfur.

CROSS-REFERENCE TO RELATED APPLICATION

This application is a continuation-in-part of our co-pending application Ser. No. 630,544, filed Apr. 13, 1967, now abandoned.

BACKGROUND OF THE INVENTION

The polymerization of lower vinyl esters such as vinyl acetate is frequently accomplished in a process wherein vinyl ester monomer is continuously fed to a polymerizer and vinyl ester polymer product and unreacted monomer are continuously removed. Recovery of the product is accomplished by stripping off the volatile lower vinyl ester monomer, generally for recycle in the polymerization process. During the stripping operation it is very desirable to inhibit further polymerization of the unreacted vinyl ester monomer. When such polymerization is not prevented, difficulty is experienced in controlling the polymer product viscosity and the upper regions of the still have a tendency to clog with cross-linked polymer.

As illustrated in U.S. Pat. 1,768,434 issued on June 24, 1930, to K. G. Blaikie, sulfur has for many years been known as a good vinyl polymerization inhibitor. Consequently, it has been the practice to add sulfur to the stripper to inhibit polymerization during stripping. While vinyl ester polymerization is inhibited, the use of sulfur is accompanied by harmful side effects which are particularly undesirable when the polymer product is subsequently alcoholyzed to the corresponding alcohol and derivative products. Among others, these side effects include a residual sulfur based odor and an increase in product color thought to be due to aldehyde formation and/or iron pick-up from the processing equipment. Similar disadvantages are encountered when other known inhibitors are used.

SUMMARY OF THE INVENTION

According to the present invention there is provided a method of effectively inhibiting further lower vinyl ester polymerization during its removal from the polymer product while, at the same time, avoiding the detrimental effects of odor and color in the polymer product. The present invention comprises using, as a vinyl ester polymerization inhibitor, a colorless hydrazine compound having at least one free nitrogen bonded hydrogen atom. The hydrazine compound is generally added in a methanol solution and can be introduced directly into the stripper or added to the vinyl ester/polymer stream from the polymerizer.

DESCRIPTION OF THE INVENTION

As used herein, the term "lower vinyl ester" includes those esters which can be stripped at atmospheric pressure without the necessity of using extraordinarily heigh stripping temperatures. Preferably, the stripping operation is accomplished at a temperature below about 130 C. and, consequently, esters boiling below this temperature are included within the above term. While vinyl acetate is the most common, other lower vinyl esters are those such as vinyl formate, vinyl propionate, and vinyl butyrate.

The effectiveness of using the process of this invention is not limited by the method in which the vinyl ester is polymerized. Thus, any solution or emulsion polymerization technique can be used. Also, the present invention is not limited by the particular catalyst system employed for the polymerization. Thus, hydrazine effectively inhibits stripper polymerization even when active free radical polymerization catalysts such as acetyl peroxide or azobisisobutyronitrile are used. Free radical polymerization catalysts are generally usable. Among such free radical catalysts are the organic azo compounds of the kind described in Hunt U.S. Pat. 2,471,959, which include the symmetrical azo compounds such as alpha, alpha'-azobis (alpha, gamma-dimethylvaleronitrile) and alpha,alpha'-azobis(alpha, gamma-dimethyl-gamma-methoxyvaleronitrile); also, the acyl peroxides such as benzoyl peroxide, and the alkyl peroxydicarbonates such as isopropyl and secondary butyl peroxydicarbonates.

In addition to the preparation of homopolymers of vinyl esters, the present invention is applicable in the formation of copolymers prepared by polymerizing lower vinyl esters with other polymerizable monomers. For example, useful copolymers are those prepared by polymerizing vinyl acetate in the presence of a small amount of a long chain terminally unsaturated monoolefin. As disclosed in U.S. Pat. 2,668,809 issued on Feb. 9, 1954, to Bryant and Cornthwaite, polyvinyl alcohols prepared from such polymers possess high viscosities and have many desirable properties. Using the hydrazine inhibitors of this invention prevents the formation of cross-linked and low molecular weight polymer and, consequently, avoids the addition of such polymer to the uniform high molecular weight vinyl acetate polymer product from the polymerizer.

The present invention is also applicable in the preparation of many other lower vinyl ester copolymers. More particularly, useful known copolymers are those prepared by polymerizing the vinyl ester with, among others, acrylates, methacrylates, olefins such as ethylene and propylene, unsaturated carboxylic acids such as acrylic, methacrylic, and crotonic acids, vinyl compounds such as vinyl pyrrolidone, and acid maleate esters. While the present hydrazine inhibitors are effective in the preparation of such copolymers containing only a minor amount of vinyl ester, customarily the useful copolymers contain greater than 90 percent vinyl ester.

When a solution polymerization process is used, hydrazine itself can be employed as the inhibitor. However, a hydrazine salt is generally used in order to eliminate the possible reaction of hydrazine with vinyl acetate in the presence of small quantities of water that may be present in the vinyl acetate/polymer feed stream to the stripper. If an emulsion polymerization technique in water is used, a hydrazine salt is employed.

A wide variety of hydrazine salts can be used, subject to several restrictions. Since color control of the polyvinyl acetate is generally important, a colorless hydrazine salt is customarily a requisite. Similarly, when the polyvinyl acetate is to be alcoholyzed, the hydrazine salts of mineral acids are usually not desirable. The sodium salts of these acids, formed during alcoholysis with an alkaline catalyst, are difficult to remove from the derived polyvinyl alcohol by ordinary washing techniques.

In general, almost any colorless hydrazine salt of an organic acid having an ionization constant equal to or greater than acetic acid is useful in the present invention. From the viewpoint of volatility, salts of higher organic acids are preferred, however, their limited methanol solubility frequently resists their use. Examples of hydrazine inhibitors useful in the present invention include hydrazine hydrate, hydrazine fumarate, hydrazine citrate, hydrazine acetate, hydrazine oxalate, hydrazine sulfate, and hydrazine tartrate. Additionally, substituted hydrazines as well as salts of substituted hydrazines can be used so long as there is at least one free nitrogen bonded hydrogen atom. The most commonly used substituted hydrazines are methyl hydrazine, ethyl hydrazine, and 1,1-dimethylhydrazine.

The amount of hydrazine required in the present invention depends on a variety of factors. The more important of these factors include the volatility of the hydrazine inhibitor, the temperature at which the vinyl acetate stripping is accomplished, the vinyl acetate concentration in the feed stream to the stripper, and the concentration and activity of the catalyst in the feed stream. Additionally, the inhibitor concentration is influenced by the vinyl acetate activity and the degree to which it is desired to inhibit polymerization.

A factor that must be considered in establishing the inhibitor concentration is the available means for removing hydrazine from the vinyl acetate distillate. In general, the stripper is not provided with means for rectifying the distillate and, consequently, some hydrazine will be carried off with the vinyl acetate. Obviously, as the hydrazine concentration in the stripper is increased, the amount in the distillate increases. If the vinyl acetate is recycled to the polymerizer without substantial removal of the hydrazine inhibitor, undesired inhibition of polymerization will result. Therefore, if no provision is made for removing the hydrazine prior to recycle, a lower concentration in the stripper is necessary.

The amount of hydrazine inhibitor removed from the stripper with the polyvinyl acetate product is not controlling as to desirability of the product obtained. As shown in U.S. Pat. 2,862,916 issued Dec. 2, 1958, to Lukman and Lowe and in U.S. Pat. 2,850,489 issued on Sept. 2, 1958, to Turnbull, the treatment of polyvinyl acetate with hydrazine prior to or during alcoholysis has a beneficial effect.

As is evident from the preceding discussion, it is difficult to establish a hydrazine concentration which is optimum under all conditions. A hydrazine moiety inhibitor concentration of about 200 parts per million (p.p.m.), based on the weight of unreacted monomer to the stripper, is generally sufficient to inhibit polymerization at atmospheric stripping pressure and ordinary catalyst concentrations. Thus, where the hydrazine concentration in the distillate is not a problem due, for example, to either low inhibitor volatility or adequate hydrazine removal equipment, such an inhibitor concentration is generally employed. On the other hand, where it is important to control the inhibitor concentration in the distillate and the inhibitor itself is comparatively volatile, hydrazine moiety concentrations of about 100 p.p.m., and generally about 20–50 p.p.m., are used. However, where a high catalyst concentration is used, increased amounts of inhibitor are required.

The following examples illustrate the invention. All parts and percentages are by weight unless otherwise indicated. For Example I, the polyvinyl acetate polymerization is accomplished in a methanol solution at about 60° C. with an acetyl peroxide catalyst. The amount of polymerized vinyl acetate is determined by analysis of the solids content in the polymerizer. Presented below are the compositions, in parts by weight, of the feed streams to the polymerizer and the stripper for two individual runs, denoted as A and B.

|  | Polymerizer feed stream | | Stripper feed stream | |
| --- | --- | --- | --- | --- |
|  | Run A | Run B | Run A | Run B |
| Vinyl acetate | 90 | 80 | 60 | 50 |
| Methanol | 10 | 20 | 10 | 20 |
| Polymer |  |  | 30 | 30 |
| Catalyst | 0.1 | 0.1 | 0.1 | 0.1 |

EXAMPLE I

A 10% methanol solution of hydrazine monoacetate is continuously metered into the stripper feed stream for Run A in an amount to give a hydrazine moiety concentration of 25 p.p.m., based on the vinyl acetate in the feed stream. The feed stream is then introduced into a stripper, with bottom and top temperatures of 58° C. and 65° C., respectively. The distillate and polymer are continuously removed. Over a period of thirty minutes, four 50 gram samples of the stripped polymer are alcoholyzed (99+%) and their viscosity determined in order to indicate whether vinyl acetate polymerization in the stripper is being effectively inhibited. A similar procedure is carried out using the stripper feed stream of Run B, with stripper bottom and top temperatures of 58° C. and 65° C., respectively. Alcoholysis is accomplished in methanol using a sodium methylate catalyst.

For comparative purposes, inhibition with sulfur is also observed by adding to the stripper feed streams of Runs A and B 25 p.p.m. sulfur, based on the unreacted monomer in the stripper feed stream, as a 0.3% solution in methanol. The stripping conditions and alcoholysis are the same as those for the hydrazine runs. The following table presents the results of the measured viscosities. The viscosity (centipoises) is measured on a 4% aqueous solution at 20° C. using a "Hoeppler" viscometer.

TABLE 1

|  | Viscosity of Polyvinyl Alcohol | | | |
| --- | --- | --- | --- | --- |
|  | Hydrazine | | Sulfur | |
| Run | A | B | A | B |
| Sample: |  |  |  |  |
| 1 | 60.1 | 30.6 | 62.8 | 31.8 |
| 2 | 62.0 | 30.0 | 62.4 | 32.3 |
| 3 | 61.0 | 31.6 | 63.0 | 30.6 |
| 4 | 60.6 | 29.8 | 64.2 | 31.3 |

In the above example, prior to adding the inhibitor to the stripper feed streams, 100 ml. aliquots of the feed streams to the stripper are quenched in ice water to prevent any further polymerization and to precipitate the polymers. The polymers are then filtered, washed, and alcoholyzed to polyvinyl alcohol as in the example. The viscosities of the polyvinyl alcohol products are as follows:

Run A—60 centipoises
Run B—30 centipoises

The odor of the samples from Example I is also determined. This is accomplished by slurrying 10 gram samples in ice water and subsequently heating them, with agitation, for 60 minutes at 90° C. After cooling to 70° C., the odor is observed. Table 2 presents the results of these odor tests. No difference is observed between Runs A and B.

TABLE 2.—COMPARISON OF ODOR

Stripped polymer:
  Hydrazine inhibited _____ No objectionable odor.
  Sulfur inhibited _____ Characteristic objectionable odor.
Alcoholyzed product:
  Hydrazine inhibited _____ No objectionable odor.
  Sulfur inhibited _____ Characteristic objectionable odor.
Filtrate from the alcoholyzed product:
  Hydrazine inhibited _____ No odor overtone.
  Sulfur inhibited _____ Objectionable overtone.

Samples of the polyvinyl acetate polymer from Run A are tested for color stability with respect to stainless steel by formulating compositions consisting of 57% vinyl acetate, 33% polyvinyl acetate, and 10% methanol. The compositions are placed in stainless steel containers and observed after one and three weeks, respectively, with the following results:

TABLE 3

| Inhibitor | Color | |
|---|---|---|
| | 1 week | 3 weeks |
| Hydrazine | Colorless | Colorless. |
| Sulfur | Light yellow | Yellow. |

Polymer samples held in the dark in aluminum containers for 3 weeks at 50° C. show some white floc and black spots irrespective of whether hydrazine or sulfur is used as the inhibitor.

Additionally, the polyvinyl alcohol samples of Run B are tested for color, as indicated by percent yellowness, and gel; the results being reported in Table 4. The color of the powder samples is determined with a "Hunter Multipurpose Reflectometer" by the double-observation method using green and blue filters. Percent yellowness is calculated using the following formula:

$$\frac{\text{Green Reading} - \text{Blue Reading}}{\text{Green Reading}} = \text{Percent yellowness}$$

The color of the solution samples is determined with a "Coleman Junior Spectrophotometer." Percent transmittance (T) is observed at wave length scale readings of 640, 560, and 450. Percent yellowness is calculated using the following formula:

$$\frac{(T_{640} - T_{450}) \times 100}{T_{560}} = \text{Percent yellowness}$$

Gel is determined by the filtration of 100 ml. of a 4% solution of the polymer through 5 micron porosity "Millipore" membrane.

dried to a constant weight in a forced air oven at 115° C. The percent solids is calculated as:

Percent solids = 100

$$\times \left[ \frac{\text{Initial weight (sample+tare)} - \text{dried wt. (residue+tare)}}{\text{Initial weight (sample+tare)}} \right]$$

Table 5 presents the results of these tests.

TABLE 5

Run A

| Inhibitor: | Percent solids |
|---|---|
| Hydrazine | 22 |
| Sulfur | 21 |

Run B

| Inhibitor: | Percent solids |
|---|---|
| Hydrazine | 23 |
| Sulfur | 26 |

As Table 5 illustrates, for the designated runs, sulfur and hydrazine are about equivalent in their effect on the subsequent polymerization of the stripped vinyl acetate.

EXAMPLES II–V

Four vinyl acetate copolymers are prepared by polymerising 900 grams vinyl acetate with 9 grams of the following monomers: acrylic acid (Example II); methacrylic acid (Example III); monomethyl maleate (Example IV); and vinyl pyrrolidone (Example V). Polymerization to 30 percent solids is accomplished over about 90 minutes in 100 grams of methanol at about 65° C. using 1.5 grams of azobisisobutyronitrile as a catalyst.

Inhibitor efficiency is illustrated by adding amounts of inhibitor to samples of the prepared 30 percent solids polymerization mixtures, refluxing the samples with inhibitor for 2 hours at 65–68° C. and, subsequently, measuring the percent solids to determine the amount of increase. Table 6 illustrates the inhibiting effects of hydrazine and sulfur with respect to these copolymers.

TABLE 4

| Inhibitor | Powder color (Percent yellow) | | Water solution color (Percent yellow) of— | | | | Gel | |
|---|---|---|---|---|---|---|---|---|
| | | | 4% solution | | 10% solution | | | |
| | I [1] | II [2] | I | II | I | II | I | II |
| Hydrazine | 9.2 | 14.2 | 5.2 | 13.7 | 20.0 | 35.0 | Nil | Slight. |
| Sulfur | 12.0 | 19.0 | 15.2 | 30.4 | 33.0 | 65.0 | Nil | Very heavy. |

[1] The maximum heat treatment in drying the polyvinyl alcohol polymer product is two hours at 90° C.
[2] The polyvinyl alcohol product is heat treated for 50 hours at 150° C.

The activity of the stripper distillate for Runs A and B is also measured to comparatively indicate the amount of hydrazine and sulfur inhibitor being carried off with the distillate. The activity is measured by the percent solids increase in the distillate and is accomplished by taking a 25 ml. sample of the distillate during the run and adding to it 1.2 ml. of a 3% solution of acetyl peroxide in vinyl acetate. The mixture is then heated in a bath at 60° C. for 90 minutes, subsequent to which 0.01 gram of sulfur is added to halt polymerization. Five gram aliquots are then weighed into tared aluminum dishes and

TABLE 6

| | Percent solids after 2 hours reflux | | | | | | | | |
|---|---|---|---|---|---|---|---|---|---|
| | No inhibitor | Hydrazine moiety [1] (p.p.m.) | | | | Sulfur [2] (p.p.m.) | | | |
| Example | | 10 [3] | 20 [3] | 40 [3] | 80 [3] | 25 [3] | 35 [3] | 50 [3] | 60 [3] |
| II | 75 | 55 | 37 | 32 | 30 | 45 | 32 | 30 | 30 |
| III | 75 | 51 | 36 | 33 | 32 | 42 | 32 | 32 | 32 |
| IV | 74 | 56 | 31 | 29 | 29 | 47 | 33 | 29 | 29 |
| V | 79 | 58 | 33 | 31 | 31 | 46 | 33 | 31 | 31 |

[1] Added as 10% hydrazone monoacetate in methanol.
[2] Added as powdered sulfur.
[3] Parts per million based on weight of vinyl acetate monomer in 30 percent solids samples from the polymerization mixture.

EXAMPLES VI–XIX

A solution of 2880 g. vinyl acetate and 320 g. methanol were divided into four equal aliquots of 800 g. each. Each aliquot was polymerized under reflux at atmospheric pressure for about 90 minutes to obtain a solution containing about 30% solids (polymer). The polymerization catalysts and the percentages thereof (based upon the total weight of aliquot) used in the polymerization of the aliquots were, respectively: first aliquot (Example VI), secondary butyl peroxydicarbonate, 0.01%; second aliquot (Example VII), alpha,alpha′ - azobis(alpha, gamma - dimethyl - gamma-methoxyvaleronitrile, 0.01%; third aliquot, azobisisobutyronitrile, 0.05%; fourth aliquot, acetyl peroxide, 0.05%. Each of the approximately 30% polymerized aliquots was subdivided into eight equal parts or subaliquots to which were added, respectively, the kinds and amounts (in p.p.m., based on the weight of vinyl acetate monomer present) of inhibitors indicated in Table 7. The eight subaliquots for each example were then refluxed for 2 hours at about 58° C., following which they were analyzed for their solids (polymer) contents by the addition of 1000 p.p.m. sulfur and drying to constant weight. The inhibiting effects of hydrazine and of sulfur are evident from the data obtained and reported in Table 7.

TABLE 7

| Example | Percent solids after 2 hours reflux | | | | | | | |
|---|---|---|---|---|---|---|---|---|
| | No inhibitor | Hydrazine [1] (p.p.m.) | | | | Sulfur [2] (p.p.m.) | | |
| | | 10 [3] | 20 [3] | 40 [3] | 80 [3] | 25 [3] | 35 [3] | 50 [3] |
| VI | 50 | 40 | 30 | 30 | 30 | 37 | 30 | 30 |
| VII | 50 | 42 | 30 | 31 | 30 | 36 | 31 | 30 |
| VIII | 75 | 55 | 31 | 30 | 30 | 45 | 30 | 30 |
| XIX | 80 | 60 | 33 | 31 | 30 | 55 | 31 | 30 |

[1] Added as 10% hydrazine monoacetate in methanol.
[2] Added as powdered sulfur.
[3] Parts per million based on weight of vinyl acetate monomer in 30 percent solids samples from the polymerization mixture.

As was the case with the polyvinyl acetate of Example I the polymers of Examples II–XIX that were inhibited with hydrazine were superior to those that were inhibited with sulfur with respect to odor, color and gel properties.

We claim:

1. In a process of preparing a polymer containing polymerized vinyl ester units comprising partially polymerizing an amount of a lower vinyl ester monomer in the presence of a free radical polymerization catalyst and thereafter, while inhibiting additional monomer polymerization, stripping the unpolymerized lower vinyl ester monomer from the polymer; the improvement comprising stripping said unpolymerized monomer in the presence of a polymerization inhibitor consisting essentially of a colorless hydrazine compound having at least one free nitrogen bonded zine compound having at least one free nitrogen bonded hydrogen atom to inhibit additional monomer polymerization, said hydrazine compound being hydrazine, hydrazine hydrate, an alkyl substituted hydrazine, or a hydrazine salt.

2. The process of claim 1 wherein the lower vinyl ester monomer is vinyl acetate.

3. The process of claim 2 wherein the polymer is polyvinyl acetate.

4. The process of claim 1 wherein the hydrazine compound is a colorles hydrazine salt of an organic acid, the acid having an ionization constant which is at least as great as that of acetic acid.

5. The process of claim 4 wherein the hydrazine compound is hydrazine monoacetate.

6. The process of claim 5 wherein the lower vinyl ester monomer is vinyl acetate.

7. The process of claim 6 wherein the polymer is polyvinyl acetate.

References Cited

UNITED STATES PATENTS

| 1,768,434 | 6/1930 | Blaikie. |
| 2,668,809 | 2/1954 | Bryant et al. |
| 2,803,623 | 8/1957 | Anderson. |
| 2,850,489 | 9/1958 | Turnbull. |
| 2,862,916 | 12/1958 | Lukman et al. |
| 2,957,855 | 10/1960 | McLeod. |
| 3,091,602 | 5/1963 | Himes et al. |
| 3,129,263 | 4/1964 | Feldman et al. |

OTHER REFERENCES

Polymer Processes, Schildknecht, p. 147.

JOSEPH L. SCHOFER, Primary Examiner

S. M. LEVIN, Assistant Examiner

U.S. Cl. X.R.

260—78.5, 85.7, 86.1, 87.3, 91.3